(12) United States Patent
May et al.

(10) Patent No.: US 6,934,938 B2
(45) Date of Patent: Aug. 23, 2005

(54) METHOD OF PROGRAMMING LINEAR GRAPHS FOR STREAMING VECTOR COMPUTATION

(75) Inventors: Philip E. May, Palatine, IL (US); Kent Donald Moat, Winfield, IL (US); Raymond B. Essick, IV, Glen Ellyn, IL (US); Silviu Chiricescu, Chicago, IL (US); Brian Geoffrey Lucas, Barrington, IL (US); James M. Norris, Naperville, IL (US); Michael Allen Schuette, Wilmette, IL (US); Ali Saidi, Cambridge, MA (US)

(73) Assignee: Motorola, Inc., Schaumburg, IL (US)

( * ) Notice: Subject to any disclaimer, the term of this patent is extended or adjusted under 35 U.S.C. 154(b) by 592 days.

(21) Appl. No.: 10/184,743

(22) Filed: Jun. 28, 2002

(65) Prior Publication Data

US 2004/0003376 A1 Jan. 1, 2004

(51) Int. Cl.[7] .................................................. G06F 9/44
(52) U.S. Cl. ..................... 717/132; 717/100; 717/106; 717/133; 717/156; 712/7; 712/8; 712/201; 708/490
(58) Field of Search .............................. 717/106, 107, 717/100, 132, 155, 156; 712/2, 7, 8, 30, 201; 703/27, 14; 708/490

(56) References Cited

U.S. PATENT DOCUMENTS

| | | | | |
|---|---|---|---|---|
| 3,718,912 A | * | 2/1973 | Hasbrouck et al. | ......... 712/217 |
| 5,652,909 A | | 7/1997 | Kodosky | |
| 5,734,863 A | * | 3/1998 | Kodosky et al. | ............... 703/27 |
| 5,821,934 A | * | 10/1998 | Kodosky et al. | ............ 715/763 |
| 5,881,257 A | * | 3/1999 | Glass et al. | .................. 712/200 |
| 5,881,263 A | * | 3/1999 | York et al. | .................... 712/217 |
| 5,966,528 A | * | 10/1999 | Wilkinson et al. | .......... 712/222 |
| 5,969,975 A | * | 10/1999 | Glass et al. | .................. 708/490 |
| 5,999,736 A | * | 12/1999 | Gupta et al. | ................. 717/158 |
| 6,064,819 A | * | 5/2000 | Franssen et al. | ............. 717/156 |
| 6,128,775 A | * | 10/2000 | Chow et al. | ................. 717/156 |
| 6,588,009 B1 | * | 7/2003 | Guffens et al. | ............. 717/161 |
| 6,732,354 B2 | * | 5/2004 | Ebeling et al. | ............. 717/119 |
| 6,745,160 B1 | * | 6/2004 | Ashar et al. | ................... 703/14 |

OTHER PUBLICATIONS

Title: Efficient Computation of Flow Insensitive Interprocedural Summary Information, author: Cooper et al, ACM, 1984.*

Title: Vector Execution of Flow Graphs, author: Strong, ACM, 1983.*

* cited by examiner

Primary Examiner—Chameli C. Das

(57) ABSTRACT

A method for producing a formatted description of a computation representable by a data-flow graph and computer for performing a computation so described. A source instruction is generated for each input of the data-flow graph, a computational instruction is generated for each node of the data-flow graph, and a sink instruction is generated for each output of the data-flow graph. The computational instruction for a node includes a descriptor of an operation performed at the node and a descriptor of each instruction that produces an input to the node. The formatted description is a sequential instruction list comprising source instructions, computational instructions and sink instructions. Each instruction has an instruction identifier and the descriptor of each instruction that produces an input to the node is the instruction identifier. The computer is directed by a program of instructions to implement a computation representable by a data-flow graph.

18 Claims, 4 Drawing Sheets

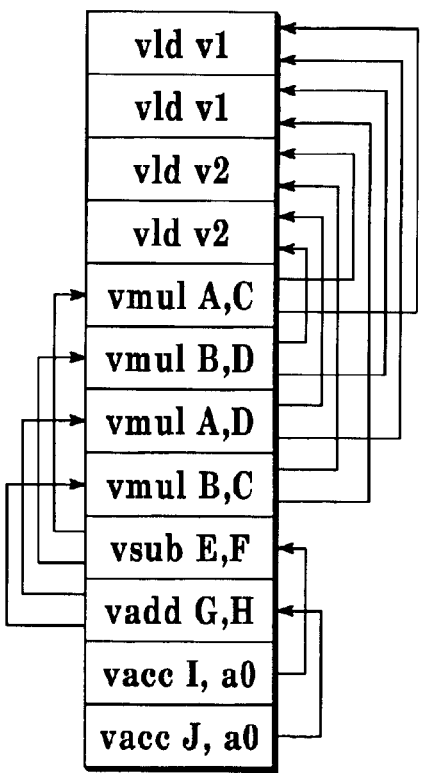
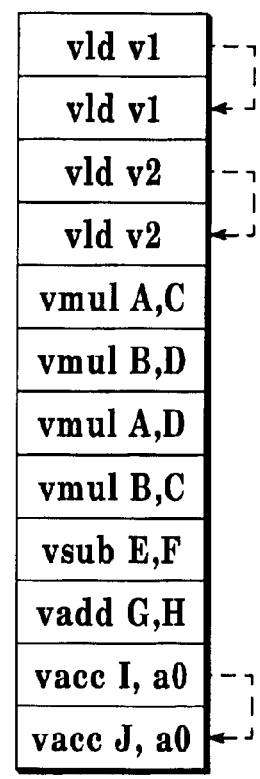
FIG. 2     FIG. 3     FIG. 4

METHOD OF PROGRAMMING LINEAR GRAPHS FOR STREAMING VECTOR COMPUTATION

CROSS REFERENCE TO RELATED APPLICATIONS

This application is related to co-pending patent applications titled "INTERCONNECTION DEVICE WITH INTEGRATED STORAGE" and identified by U.S. Ser. No. 10/184,609, U.S. Pat. No. 6,850,536 and "MEMORY INTERFACE WITH FRACTIONAL ADDRESSING" and identified by U.S. Ser. No. 10/184,582, U.S. Pat No. 6,799,261, "STREAMING VECTOR PROCESSOR WITH RECONFIGURABLE INTERCONNECTION SWITCH" and identified by U.S. Ser. No. 10/184,583, "SCHEDULER FOR STREAMING VECTOR PROCESSOR" and identified by U.S. Ser. No. 10/184,772, which are filed on even day herewith and are hereby incorporated herein by reference.

FIELD OF THE INVENTION

This invention relates generally to the field of vector processing. More particularly, this invention relates to a method of programming linear data-flow graphs for streaming vector computing and to a computer for implementing the resulting program of instructions.

BACKGROUND OF THE INVENTION

Many new applications being planned for mobile devices (multimedia, graphics, image compression/decompression, etc.) involve a high percentage of streaming vector computations. In vector processing, it is common for a set of operations to be repeated for each element of a vector or other data structure. This set of operations is often described by a data-flow graph. For example, a data-flow graph may be used to describe all of the operations to be performed on elements of the data structure for a single iteration of a program loop. It may be necessary to execute these operations number of times during the processing of an entire stream of data (as in audio or video processing for example). Computing machines that do this processing would be benefit from a representation of the data-flow graph that can be executed directly.

It would also be beneficial if the representation were expressive enough for execution on a range of computing machines with different parallel processing capabilities. Consequently, the representation must be both a series of computations for linear execution on a sequential computing machine and also a list of operational dependencies within and between iterations for concurrent execution on a parallel computing machine.

In a conventional (Von Neumann) computer, a program counter (PC) is used to sequence the instructions in a program. Program flow is explicitly controlled by the programmer. Data objects (variables) may be altered by any number of instructions, so the order of the instructions cannot be altered without the risk of invalidating the computation.

In a data-flow description, data objects are described as the results of operations, so an operation cannot be performed until the data is ready. Apart from this requirement, the order in which the operations are carried out is not specified.

It is possible to represent the operations of a data-flow graph as a series of operations from a known computer instruction set, such the instruction sets for the Intel x86 or Motorola M68K processors. However, the resulting programs are difficult to execute in a parallel manner because unnecessary dependencies often force serialization of the operations. These unnecessary dependencies arise because all results of operations must be stored in a small set of named registers before being used in subsequent operations. This creates resource contention and results in serialization, even for computing machines that have additional registers. The use of named registers to pass results also obscures the differences between data dependencies within an iteration and data dependencies between iterations. If it is known that there are no dependencies between iterations, then all iterations of a loop can be implemented simultaneously: The parallelism is limited only by the amount of resources on the computing machine.

Consequently, there is an unmet need for a method for describing a data-flow graph that represents both operational dependencies and data dependencies whilst avoiding the use of named registers.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

FIG. 2 is a table of a sequential instruction list in accordance with the present invention.

FIG. 3 is a table of a sequential instruction list in accordance with the present invention showing data dependencies.

FIG. 4 is a table of a sequential instruction list in accordance with the present invention showing order dependencies.

DETAILED DESCRIPTION OF THE INVENTION

Figure 1:
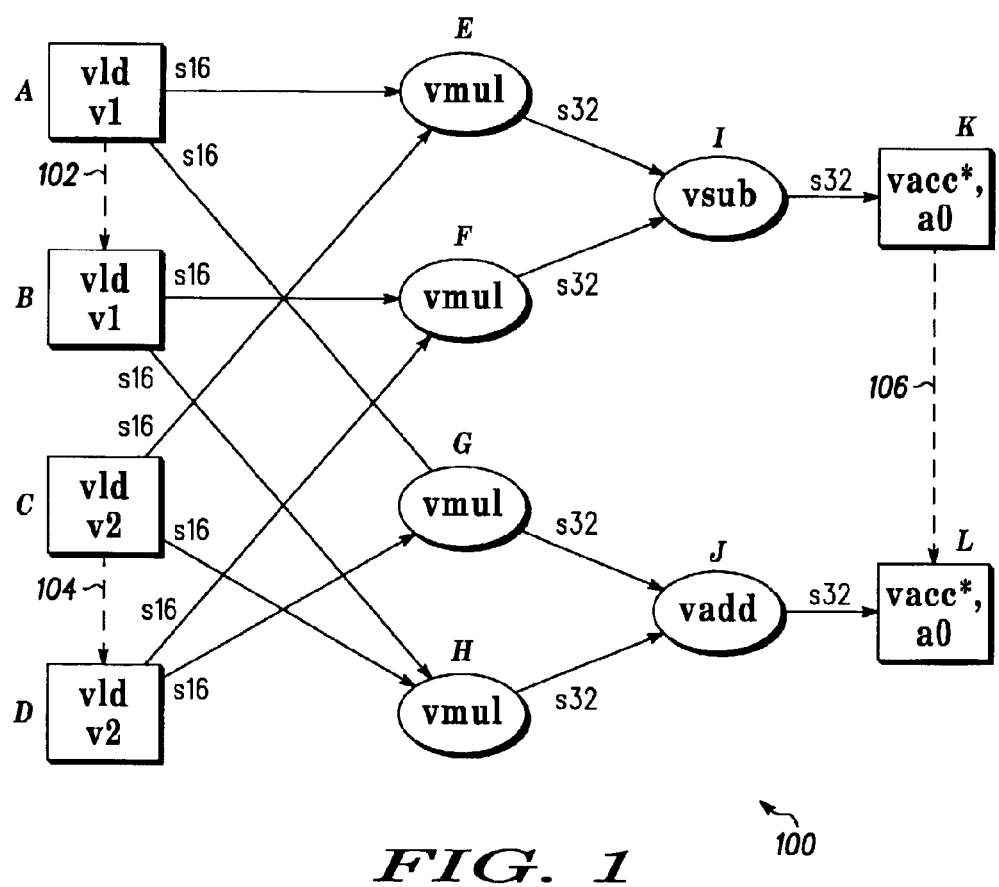
FIG. 1 is an exemplary data-flow graph.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The present invention relates to a computer program execution format for a general-purpose machine for accelerating iterative computations on streaming vectors of data. The invention also relates a computer for executing a program in the specified format. The format is the instruction set of a sequential data-flow processor with all of the dependencies explicitly stated to facilitate parallel execution.

Computations are conveniently represented as data-flow graphs. An exemplary data-flow graph is shown in FIG. 1. Referring to FIG. 1, the data-flow graph 100 consists of a number of external interaction blocks, A, B, C, D, K and L, and a number of computational nodes E, F, G, H, I and J. The computational nodes are also referred to a processing nodes or functional nodes. In the data-flow graph representation, the program flow is determined by the interconnections between the computational nodes and the external interaction blocks. The order in which parallel paths in the graph are executed is not specified. In FIG. 1, a first value from a data input stream is loaded at external interaction block A and a second value from the same stream is loaded at block B. The order of these two operations is important, so an order dependency is specified in the graph, as indicated by the broken arrow 102. Similarly, consecutive data values from a second input stream are loaded at external interaction blocks C and D, the order being indicated by broken arrow 104. At computational node E, the values loaded at A and B are multiplied (indicated by the mnemonic 'vmul'). The values input as operands to the multiplication are signed, 16-bit values, as indicated by 's16' on the inputs to node E. The output from node E, is similarly indicated as being a signed, 32-bit value ('s32'). At computational node F, the values loaded at B and D are multiplied (indicated by the mnemonic 'vmul'). The values input as operands to the multiplication are signed, 16-bit values, as indicated by 's16' on the arcs connecting blocks A and B to node F. The output from node F is similarly indicated as being a signed, 32-bit value ('s32'). Computational nodes G, F, I and J operate similarly, with the mnemonics 'vsub' and 'vadd' indicating subtraction and addition respectively. At external interaction block K, the result of the subtraction performed at node I is accumulated into a named accumulator a0. At external interaction block L, the result of the subtraction performed at node J is accumulated into the named accumulator a0.

If the first input stream is the interleaved real and imaginary parts of a complex vector x, and the second input stream is the interleaved real and imaginary parts of a complex vector y, then the accumulator contains the sum of the real and imaginary parts of the vector dot product x.y, FIG. 2 shows a linear graph representation of the data-flow graph shown in FIG. 1. Each instruction is identified by an instruction descriptor. In this example, the corresponding node identifiers from FIG. 1 are used, however, this is not a requirement. The instructions A, B, C and D indicate the loading of vector elements. The linear order of the instructions denotes order dependencies in the data-flow graph representation. Multiplication instruction E includes the mnemonic 'vmul', indicating that the operation is a multiplication, and the operands A and C. This indicates that the operands for the multiplication operation are the results of the operations A and C (the vector load operations). Note that because order dependency is indicated by the linear order of the instructions, the result of vector load A is the first data value in the input vector and the result of vector load B is the second data value in the input vector. At the next iteration of the data-flow graph, these will be the third and fourth values respectively.

In one embodiment of the present invention, the computational instruction E is written as E: vmul A, C This instruction includes the identifier of the instruction ('E'), a descriptor of the operation to be performed ('vmul') and the descriptors of the instructions that produce the operands for the computation ('A' and 'C').

In a further embodiment of the present invention, the computational instruction E is written as E: vmul.s32 A, C This instruction include the appended descriptor '.s32', indicating that the result of the operation is a signed, 32-bit value. Other descriptors include 's8', 's16', 's24', 'u8' and 'u16', for example.

The format of the present invention uses references to previous instructions, rather then named registers, to indicate the passing of operation results (data dependencies) within an iteration. The type and size of the result and whether the results is signed or unsigned (the signedness of the result) are indicated by the producing instruction. Results that are passed between iterations are explicitly indicated by instructions that manipulate a set of named registers, called accumulators, and by instructions that manipulate a set of unnamed FIFO (First-In, First-Out) registers called tunnels.

Referring to FIG. 2, instruction K accumulates the result of instruction I into an accumulator named 'a0'. This named accumulator is used in each iteration and at the start of the iteration it will hold the value from the previous iteration. Accumulator a0 is used again in instruction L. The linear order of instructions K and L indicates that the result from instruction I is accumulated before the result from operation J.

Thus, in the program format of the present invention, each external interaction node and each computational node is represented by an instruction. The instruction comprises an instruction identifier, a instruction mnemonic, and one or more operands. For computational instructions, the operands are the identifiers of the instructions that generate the inputs the computation, for external interactions the operands are the destination for input data and the source instruction and destination of output data.

Data dependencies are explicit, since the operands reference the instructions that generate the data rather than a named storage location. This is illustrated in FIG. 3. Referring to FIG. 3, the data dependencies of the linear graph are shown. The arrows point from an instruction to the prior instructions that produce the inputs for that instruction. For example, instruction H depends upon data produced by instructions B and C. Thus data dependencies are represented in the format. Operands are indicated as references to an instruction's results, thereby eliminating unnecessary contention for named registers.

Dependencies due to the execution order of instructions that cause changes in state, called order dependencies, are indicated by the serial order of these non-independent instructions in the instruction list. FIG. 4 shows the order dependencies of the computation. The broken arrows point from the first instruction to be executed to a subsequent instruction. Order dependencies are specified independently of the data dependencies, thereby supporting simultaneous execution of multiple iterations as long as the order of state changes is maintained.

The computation is thus represented as a sequential instruction list, including a source instruction for each input of the data-flow graph, a computational instruction for each node of the data-flow graph and a sink instruction for each output of the data-flow graph. Each instruction includes an instruction identifier, and the computation instruction for a node includes a descriptor of the operation performed at the node and the identifier of each instruction that produces an input to the node. The computational instructions include arithmetic, multiplication and logic instructions. The source instructions include instructions to load data from an input data stream, load a scalar value from a store, load a value from an accumulator and retrieve a value from a tunnel. The sink instructions include instructions to add, subtract or store to an accumulator, output to an output data stream or pass to a tunnel.

In one embodiment of the present invention, tunnels are used to save a result from an operation in the current iteration while producing the result saved from a previous iteration. Tunnels indicate data flows between consecutive iterations in a graph, where the source and sink of the flow are the same point in the graph. This allows multiple iterations to be executed simultaneously, since data from one iteration can be concurrently passed to the next iteration. Accumulators, described above, cannot do this since their source and sinks are at different points in the data-flow graph.

Figure 5:
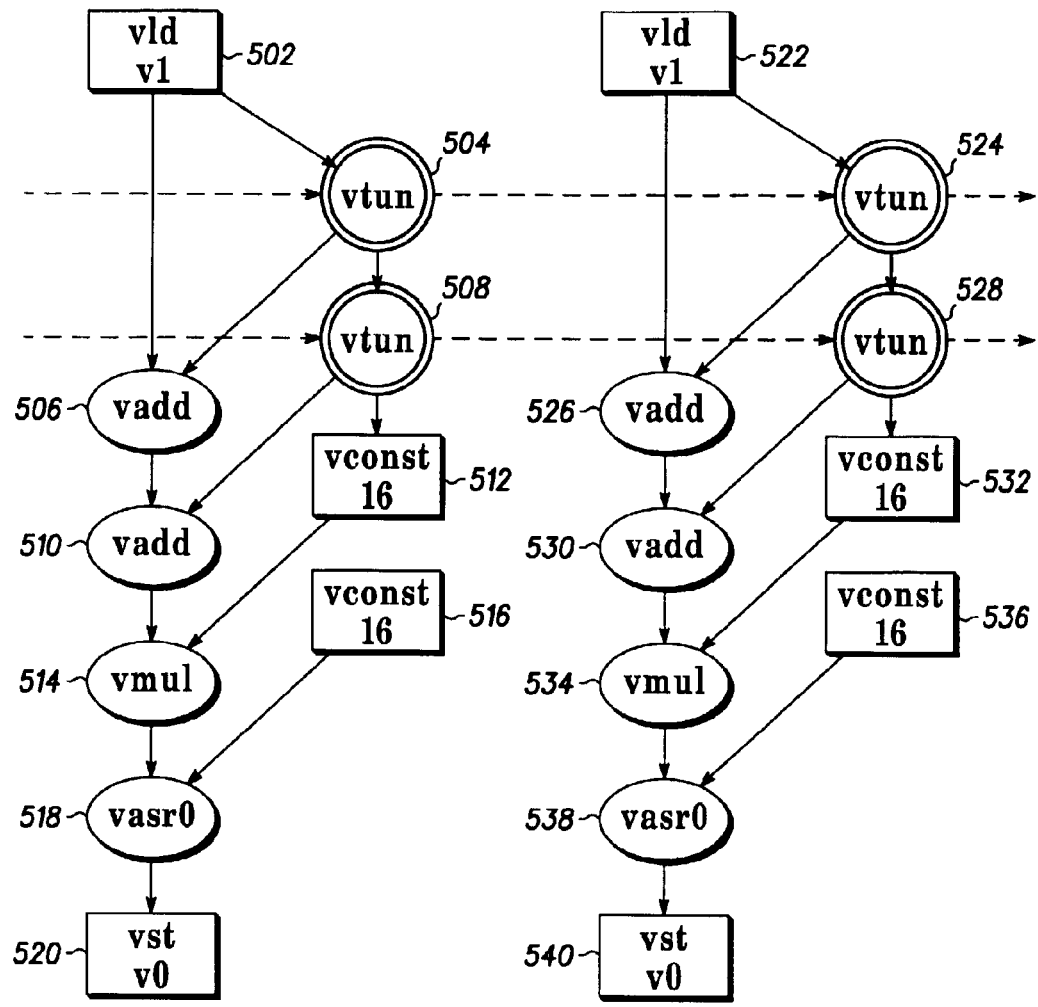
FIG. 5 is a diagrammatic representation of simultaneous execution of multiple iterations of a computation using tunnels in accordance with the present invention.

An exemplary use of tunnels is shown in FIG. 5. In this example, two consecutive iterations of a computation are performed in parallel, with data passed from one iteration to the next via two tunnels. Referring to FIG. 5, the first iteration begins with the data element being loaded into vector v1 at external interaction block 502. The data element is passed to a first tunnel 504. The data value is stored in the tunnel and the previously stored value is produced. The previously stored value is added to the loaded data element at node 506 and also passed to a second tunnel 508. The previously stored value from tunnel 508 is added at node 510 to the result of the addition 506. At node 514 the constant value from block 512 is multiplied by the result from addition 510. At node 518 the result from multiplication 510 is right-shifted by the constant (16) stored in block 516. The result from the right-shift operation is stored to output vector v0 at external interaction block 520.

The next iteration begins with the next data element being loaded into vector v1 at external interaction block 522. The data element is passed to the first tunnel 524. The data value is stored in the tunnel and the previously stored value is produced. The previously stored value is the value stored in the tunnel by the previous iteration. In this way, data is passed between iterations. The previously stored value is added to the loaded data element at node 526 and also passed to the second tunnel 528. The previously stored value is the value stored in the tunnel by the previous iteration. The previously stored value from tunnel 528 is added at node 530 to the result of the addition 526. At node 534 the constant value from block 532 is multiplied by the result from addition 530. At node 538 the result from multiplication 534 is right-shifted by the constant (16) stored in block 536. The result from the right-shift is stored to output vector v0 at external interaction block 540.

If only two iterations are carried out in parallel, the third iteration begins at block 502, and the values retrieved from the tunnels 504 and 508 are the values stored in the second iteration. The use of tunnels therefore also allows data to be passed between iterations performed in parallel.

The data-flow graph in FIG. 5 performs a three-point moving-average of a vector of data values.

Figure 6:
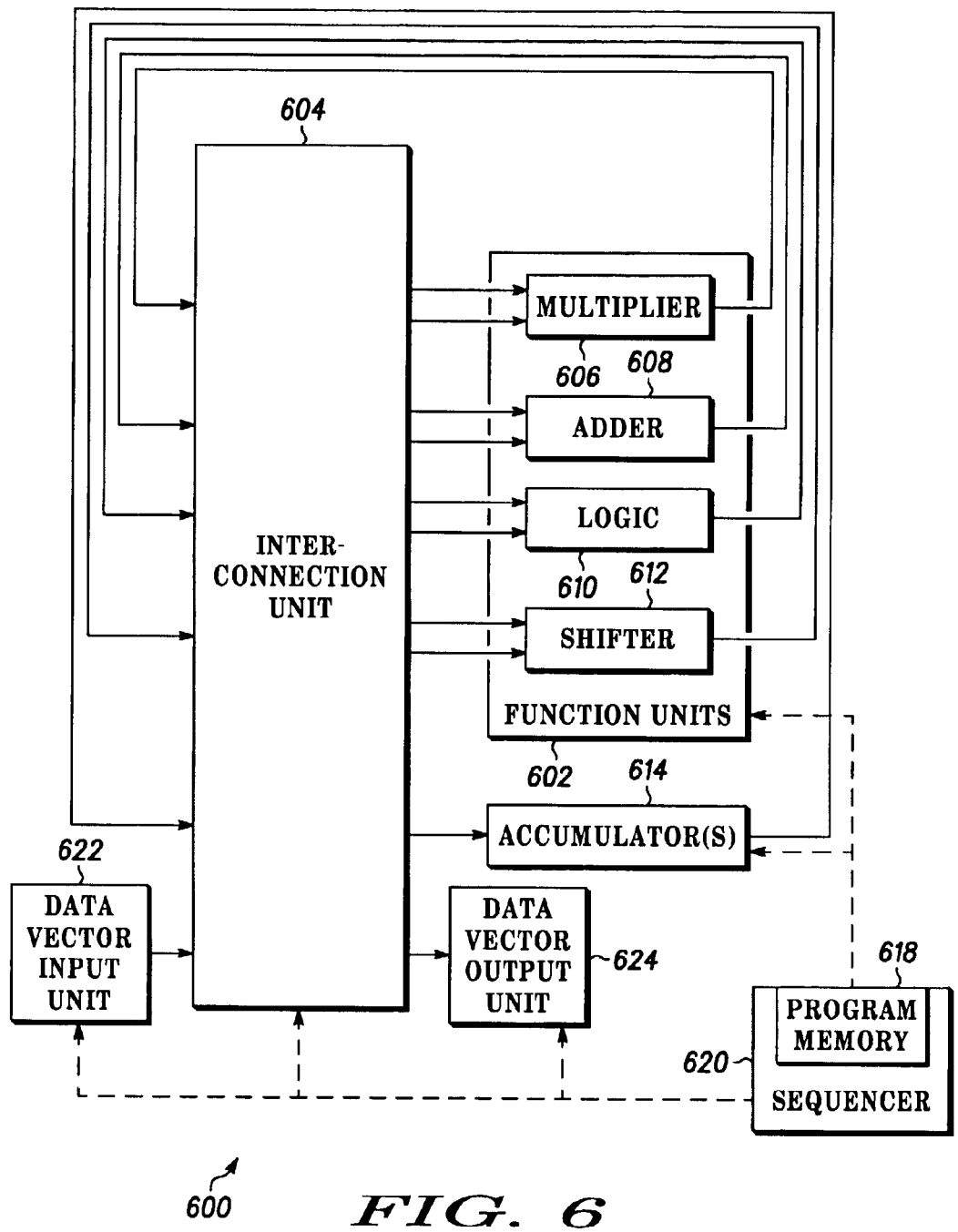
FIG. 6 is a diagrammatic representation of a computer for performing a calculation described by a sequential instruction list in accordance with the present invention.

A program of computer instructions may be generated from the sequential instruction list. The generation may include scheduling of the instructions to make efficient use of the hardware resources of the computer. The format of the present invention allows a computation to be scheduled efficiently for linear execution on a sequential computing machine or for concurrent execution on a parallel computing machine. One embodiment of a computer that is directed by a program of instructions generated from a sequential instruction list is shown in FIG. 6. Referring to FIG. 6, the computer 600 includes a number of computational units 602 and an interconnection unit 604. In the figure, the computational units are a multiplier 606, an adder (arithmetic unit) 608, a logic unit 610 and a shifter 612. Other computation units, including multiple units of the same type may be used. The interconnection unit 604 serves to connect the outputs of computational units to the inputs of other computational units. The are many forms of the interconnection unit 604, these include a re-configurable switch, data memory or a register file. An accumulator 614 may also be connected to the computation elements 602 via the interconnection unit 604. Data to be processed is passed to the interconnection unit 604 by data vector input unit 622, and processed data is retrieved from the interconnection unit by data vector output unit 624. In general, multiple data vector input and output units are used. The computer is directed by a program of instruction stored in the program memory 618 of sequencer 620. The instructions control the data vector input and output units, 622 and 624, the interconnection unit 604, the accumulator 614 and the computational units 602.

The present invention, as described in embodiments herein, is implemented using a programmed processor executing a sequential list of instructions in the format described above. However, those skilled in the art will appreciate that the processes described above can be implemented in any number of variations without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention should embrace all such alternatives, modifications and variations as fall within the scope of the appended claims.

What is claimed is:

1. A method for producing a formatted description of a computation representable by a data-flow graph, the method comprising:

generating a source instruction for each input of the data-flow graph;

generating a computational instruction for each node of the data-flow graph, the computational instruction for a node comprising a descriptor of an operation performed at the node and a descriptor of each instruction that produces an input to the node;

generating a sink instruction for each output of the data-flow graph; and generating a sequential instruction list comprising source instructions, computational instructions and sink instructions;

wherein the sink instruction is one of an instruction to put a data value into an accumulator, an instruction to add a data value to an accumulator, an instruction to subtract a data value from an accumulator, an instruction to store a data value if it is larger than a value in an accumulator and an instruction to store a data value if it is smaller than a value in an accumulator.

2. A method in accordance with claim 1, wherein the computational instruction further comprises descriptors of at least one of a type, size and signedness of a result of the operation performed at the node.

3. A method in accordance with claim 1, wherein the formatted description further comprises an instruction identifier for each instruction of the sequential instruction list and wherein at least one descriptor of each instruction that produces an input to a node is the instruction identifier of the instruction of the sequential instruction list that produces an input to the node.

4. A method in accordance with claim 1, wherein the source instruction is one of an instruction to load a data value from an input data vector, an instruction to load a data value from an accumulator and an instruction to load a data value from a tunnel.

5. A method in accordance with claim 1, wherein the sink instruction is one of an instruction to store a data value to an output data vector and an instruction to store a data value to a tunnel.

6. A method in accordance with claim 1, wherein a computational instruction comprises one of an arithmetic instruction, a multiplier instruction, a shift instruction and a logic instruction.

7. A method in accordance with claim 1, wherein a node has no more than three inputs.

8. A computer comprising:

a plurality of computational units;

an interconnection unit for interconnecting the computational units; and a program memory;

wherein the computer is directed by a program of instructions stored in the program memory to implement a computation representable by a data-flow graph, and wherein the program of instructions is generated from a sequential instruction list comprising:

a source instruction for each input of the data-flow graph;

a computational instruction for each node of the data-flow graph, the computational instruction for a node comprising a descriptor of an operation of the node and a descriptor of each instruction that produces an input to the node; and a sink instruction for each output of the data-flow graph, further comprising an accumulator, wherein the sink instruction is one of an instruction to put a data value into the accumulator, an instruction to add a data value to the accumulator, an instruction to subtract a data value from the accumulator, an instruction to store a data value if it is larger than a value in the accumulator and an instruction to store a data value if it is smaller than a value in the accumulator.

9. A computer in accordance with claim 8, wherein the computational instruction is executable on a computational unit of the plurality of computational units.

10. A computer in accordance with claim 8, wherein the interconnection unit of the computer is directed by a program of instructions stored in the program memory.

11. A computer in accordance with claim 8, wherein the interconnection unit of the computer comprises one of a data memory, a register file and a re-configurable switch.

12. A computer in accordance with claim 8, wherein the computational instruction further comprises descriptors of at least one of a type, size and signedness of a result of the operation performed at the node.

13. A computer in accordance with claim 8, wherein the program of instructions further comprises an instruction identifier for each instruction of the sequential instruction list and wherein at least one descriptor of an instruction that produces an input to a node is the instruction identifier of the instruction of the sequential instruction list that produces an input to the node.

14. A computer in accordance with claim 8, further comprising at least one of:

a data vector input unit;

a plurality of registers operable as a data tunnel; and an accumulator;

wherein the source instruction is one of an instruction to load a data value from the data vector input unit, an instruction to load a data value from the accumulator and an instructions to load a data value from the data tunnel.

15. A computer in accordance with claim 14, wherein the sink instruction is an instruction to store a data value to the data tunnel.

16. A computer in accordance with claim 8, further comprising at least one data vector output unit, wherein the sink instruction is an instruction to store a data value to the data vector output unit.

17. A computer in accordance with claim 8, wherein the computational units include one of an arithmetic unit, a multiplier and a logic unit and wherein a computational instruction comprises one of an arithmetic instruction, a multiplier instruction, a shift instruction and a logic instruction.

18. A computer in accordance with claim 8, wherein the computational units are configurable for concurrent processing multiple instructions.

* * * * *